United States Patent [19]
Lemaitre et al.

[11] Patent Number: 5,555,547
[45] Date of Patent: Sep. 10, 1996

[54] CONVOLUTIONAL CODING AND VITERBI DECODING SYSTEM TRANSPARENT TO PHASE SKIPS OF $\pi$ AND $\pi/2$, WITH APPLICATIONS IN TDMA TRANSMISSION

[75] Inventors: Didier Lemaitre, Jouy le Moutier; Jean-Pierre Bonin, Neuilly sur Seine, both of France

[73] Assignee: Alcatel Telspace, Nanterre Cedex, France

[21] Appl. No.: 388,820

[22] Filed: Feb. 15, 1995

[30] Foreign Application Priority Data

Feb. 18, 1994 [FR] France ........................... 94 01876

[51] Int. Cl.$^6$ ........................................... H04L 5/12
[52] U.S. Cl. ........................... 375/262; 375/281; 370/112; 371/43
[58] Field of Search ........................... 375/261, 262, 375/265, 281, 283, 298, 330; 371/43; 370/95.3, 112

[56] References Cited

U.S. PATENT DOCUMENTS

| | | | |
|---|---|---|---|
| 4,489,418 | 12/1984 | Mazo | 375/244 |
| 4,713,817 | 12/1987 | Wei | 371/43 |
| 4,939,734 | 7/1990 | Heichler | 375/246 |
| 5,023,889 | 6/1991 | Divsalar et al. | 375/244 |
| 5,233,630 | 8/1993 | Wolf | 375/262 |
| 5,384,809 | 1/1995 | Yagi et al. | 375/261 |

FOREIGN PATENT DOCUMENTS

0486729A1 5/1992 European Pat. Off..

WO9220162 11/1992 WIPO.

OTHER PUBLICATIONS

*40th IEEE Vehicular Technology Conference*, 6–9/1990, Orlando, US, IEEE, New York, US, 1990, pp. 471–475 Elnoubi et al "Performance of trellis coded QPSK in mobile radio channels".

*Eleventh Annual International Phoenix Conference on Computers and Communications*, 1–3/4/1992, Scottsdale, US; pp. 232–239, Ross et al, "Pragmatic tellis coded modulation; a simulation using 24–sector quantized 8–PSK".

French Search Report FR 9401876.

*Primary Examiner*—Stephen Chin
*Assistant Examiner*—T. Ghebretinsae
*Attorney, Agent, or Firm*—Sughrue, Mion, Zinn, Macpeak & Seas

[57] ABSTRACT

In a convolutional coding and Viterbi decoding system transparent to phase skips of $\pi$ and $\pi/2$ with applications in TDMA transmission, the transmitter 3 includes a demultiplexer receiving a digital bit stream and operating at the bit timing rate, a QPSK differential coder receiving the demultiplexed bit streams and supplying two coded bit streams, two convolutional coders each supplying one code word, and two multiplexers each receiving one code word from a respective convolutional coder and supplying one component of a symbol to be transmitted. The receiver generates two received symbol components which are applied to two demultiplexers each supplying one code word. Each bit of a code word is applied to a single Viterbi decoder. A QPSK type differential decoder supplies two decoded bit streams which are then multiplexed.

4 Claims, 3 Drawing Sheets

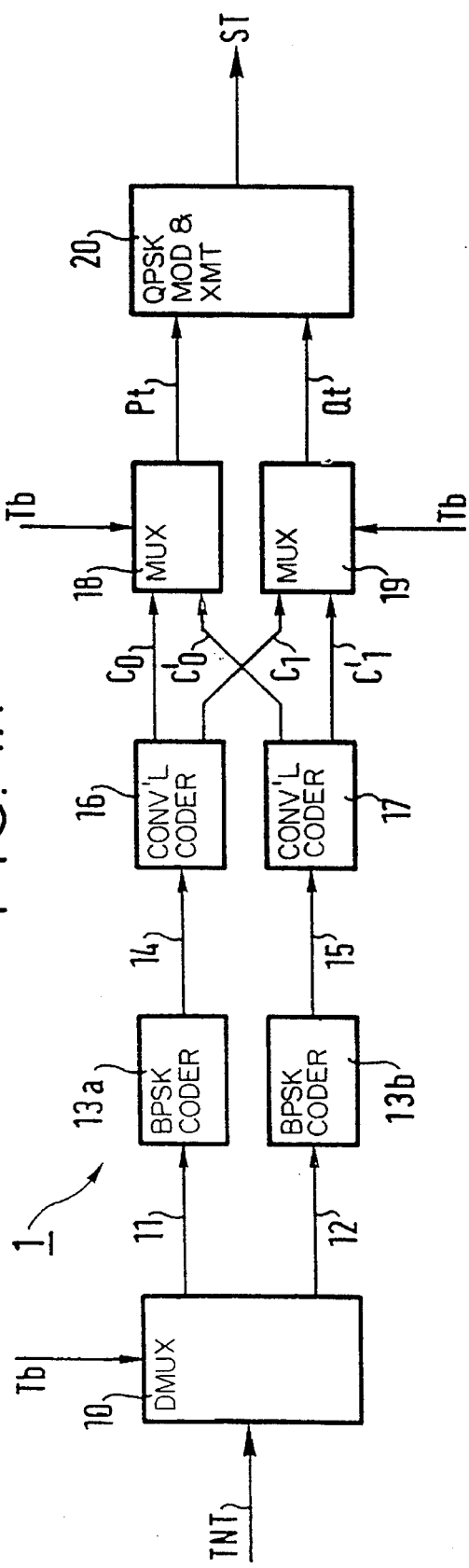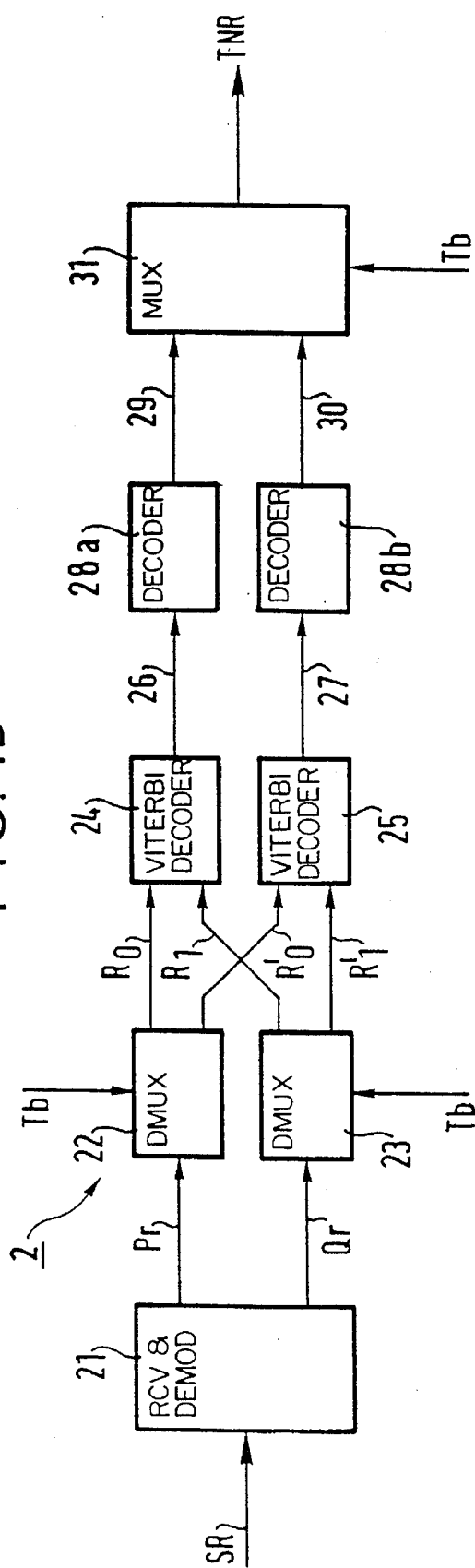

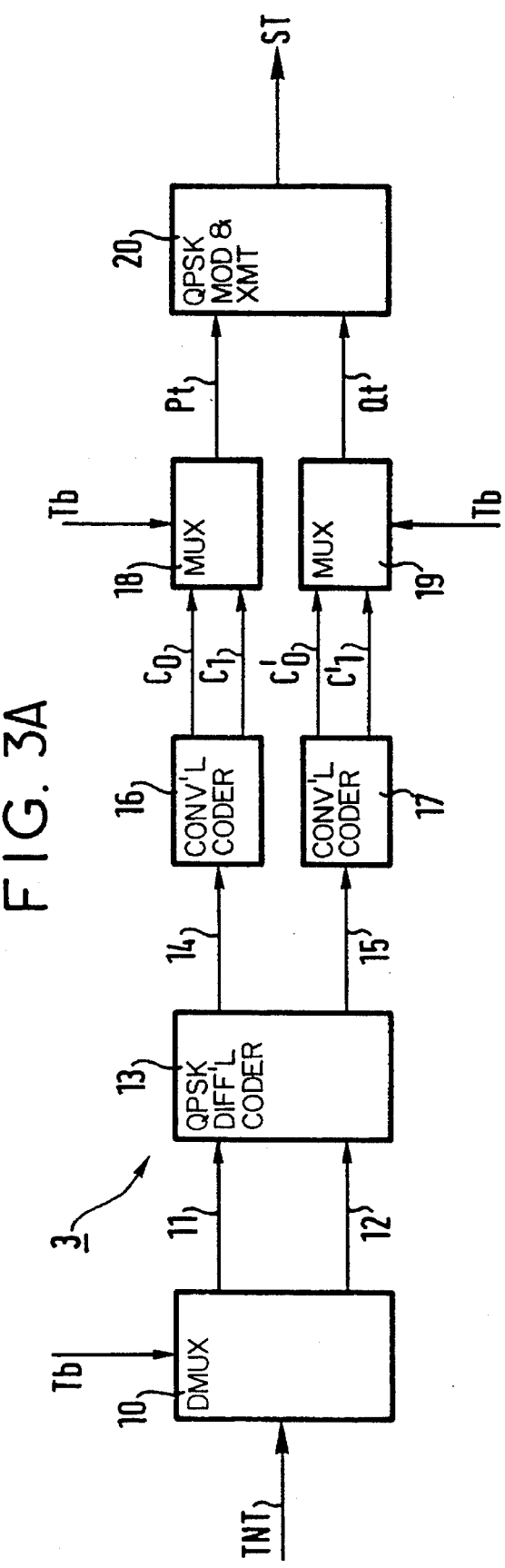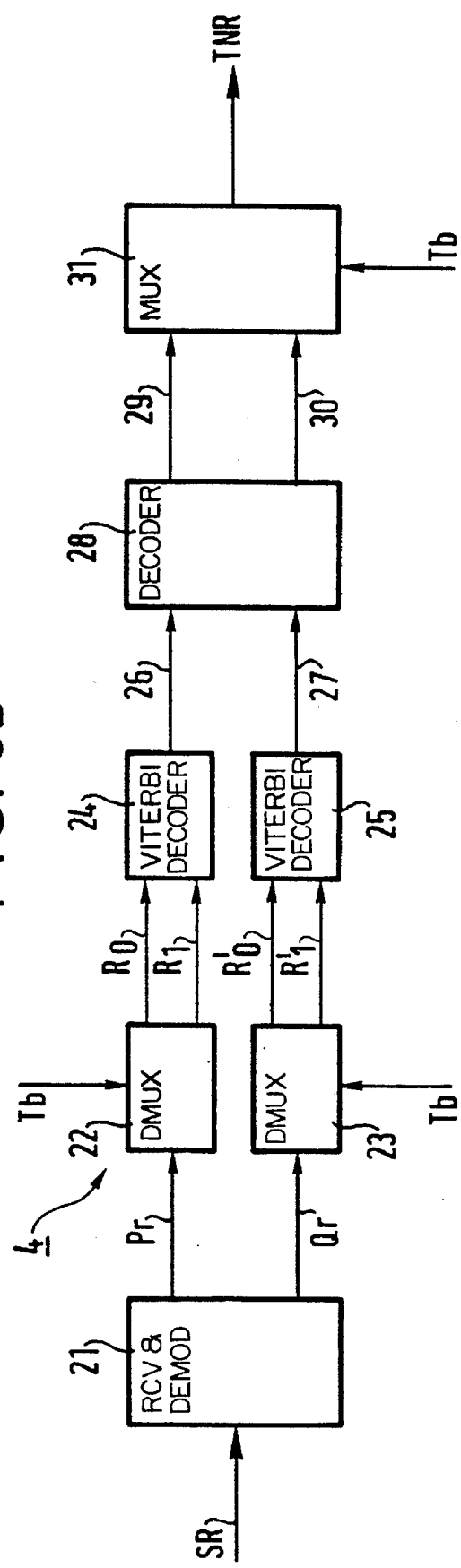

CONVOLUTIONAL CODING AND VITERBI DECODING SYSTEM TRANSPARENT TO PHASE SKIPS OF π AND π/2, WITH APPLICATIONS IN TDMA TRANSMISSION

BACKGROUND OF THE INVENTION

1. Field of the Invention

The field of the invention is that of digital data transmission, in particular by radio, and the invention is more precisely concerned with a data coding and decoding system which is transparent to carrier cycle skips of π and π/2. The system of the invention can be used for transmission of signals by satellite between a transmitter and receiver, for example TDMA (Time Division Multiple Access) transmission.

2. Description of the Prior Art

The remainder of this description refers to QPSK (Quadrative Phase Shift Keying) transmission in which each pair of bits to be transmitted is represented by a sample whose position in a complex phase plane (constellation) depends on the value of this pair.

Current digital transmission systems are increasingly making use of error correcting decoders to enable operation with lower received signal to noise ratios. For example rate ¾ convolutional coding in association with a Viterbi decoder provides a signal to noise improvement of around 4.3 dB for a bit error rate of $10^{-6}$.

TDMA transmitter/receivers also use error correction, but with additional constraints because a compromise is required in respect of carrier recovery synchronization. In TDMA systems it is necessary to recover the carrier in a time that is short enough for each received data packet to be demodulated correctly and conventional carrier recovery devices based on a feedback loop (Costas loop, phase-locked loop, etc) are not suitable because they are too slow. For this reason feed forward devices are used, having much shorter acquisition times.

However, these latter devices necessarily employ a carrier recovery filter whose bandwidth represents a compromise between:

a short synchronization acquisition time, requiring a wide bandwidth; a short synchronization acquisition time is of primordial importance in TDMA transmission because any variation in the carrier frequency can then be acted on quickly and the phase and the frequency of the demodulation signal rapidly synchronized to the carrier of the received signal; in this case the data in each packet received will be decoded correctly;

minimizing the probability of cycle skipping, which requires a narrow bandwidth; if the transmission channel is subject to noise, which incidentally justifies the use of error correcting decoding, the demodulation signal can be subject to phase skips or cycle skips of and π/2; it follows that the constellation of the received signal is rotated and that the symbols decoded no longer correspond to the symbols transmitted.

U.S. patent application Ser. No. 08/266,458 describes this problem in more detail.

The reduction in the signal to noise ratio due to the use of error correcting decoders has obliged telecommunication equipment manufacturers to reduce the bandwidth of the received carrier recovery filter and consequently to increase the length of the preamble of each packet transmitted in TDMA mode to ensure that at the end of the preamble there is no phase error in the demodulation signal. The preamble is a number of synchronization bits at the start of a packet enabling the receiver to synchronize its frequency and phase to the received signal. The solution whereby the preamble is made longer is not acceptable, however, as it reduces the packet efficiency (number of synchronization bits/total number of bits in a packet).

The INTELSAT standard IESS-308 defines a system for coding and decoding digital data transmitted between a transmitter and a receiver. A system of this kind is shown in FIGS. 1A and 1B which respectively show a digital data transmitter and a digital data receiver.

Referring to FIG. 1A, a transmitter 1 receives a digital bit stream TNT to be transmitted at a bit timing rate Tb. The digital bit stream TNT is applied to the input of a demultiplexer 10 operating at the timing rate Tb. The demultiplexer 10 supplies two demultiplexed bit streams 11, 12 (respectively comprising the even bits and the odd bits) to differential coding means comprising BPSK differential coders 13a and 13b. The differential coders each supply a coded bit stream 14, 15 to identical convolutional coders 16, 17. Each convolutional coder 16, 17 supplies two bits for each bit applied to its input (efficiency ½). The constraint length is equal to 7, for example, and the coder can have the generator polynomial G=(133, 171) in octal.

FIG. 2 shows a convolutional coder of this type, for example the coder 16.

The convolutional coder 16 receives one bit at its input 14 in each bit period and supplies two outputs bits ($C_0$ and $C_1$) in each bit period. It includes six flip-flops 40 through 45 each delaying the signal by one bit period Tb. Two modulo 2 adders 46 and 47 supply $C_0$ and $C_1$ which correspond to the codes 171 and 133 in octal, respectively. Each pair of two bits ($C_0$, $C_1$) and ($C'_0$, $C'_1$) from a convolutional coder constitutes a code word.

Referring again to FIG. 1A, the bit $C_0$ n $C'_0$ are applied to the input of a multiplexer 18 and the bits $C_1$ and $C'_1$ to the input of a multiplexer 19. Thus the processing channels are interleaved. The two multiplexers operate at the bit timing rate Tb and supply the bits supplied to their inputs alternately at their outputs. Thus in each bit period each multiplexer supplies one component Pt, Qt of a symbol to be transmitted. These components respectively correspond to the phase and quadrature components of a QPSK signal. The components Pt and Qt are applied to QPSK modulator and transmitter means 20 which supply a transmitted symbol ST.

The invention relates to radio transmission and the receiver 2 in FIG. 1B receives the signals transmitted by the transmitter 1.

The receiver 2 includes means 21 for receiving and demodulating the received symbol SR supplying two components Pr, Qr of the received symbol. The demodulator means include a carrier recovery device. Each component is applied to a demultiplexer 22, 23 operating at the bit timing rate Tb and each supplying a received code word on two bits every two bit periods. These code words ($R_0$, $R'_0$) and ($R_1$, $R'_1$) are applied to Viterbi decoders 24, 25 each supplying an output decoded word 26, 27. The bits $R_0$ and $R_1$ are applied to the Viterbi decoder 24 and the bits $R'_0$ and $R'_1$ are applied to the Viterbi decoder 25. The decoded words 26, 27 are applied to differential decoder means comprising differential decoders 28a and 28b which supply two decoded bit streams 29, 30. The differential decoders 28a and 28b resolve ambiguity in respect of cycle skips of π of the carrier recovery device, i.e. a phase difference of π between the received carrier and the local oscillator signal has no effect on the bits transmitted. A multiplexer 31 operating at the bit timing rate Tb supplies a received digital bit stream TNR produced from the decoded bit streams 29 and 30.

Thus a transmission system of this type uses two processing channels in parallel. This doubles the transmission throughput since in BPSK transmission two coders and two decoders operate in parallel.

The increase in signal to noise ratio procured by error correcting coding can nevertheless be cancelled out by unwanted cycle skips. A carrier cycle skip inverts the bits at the inputs of a decoder and as a result the metrics diverge. The Viterbi decoder takes some time to recognize this divergence and convergence of the metrics takes several thousand symbols. Consequently, the rest of the packet is lost if a cycle skip occurs during reception of a packet, or even at the start of a received packet, for example during reception of a preamble.

This phenomenon of bit inversion is shown in tables 1 and 2 below. Table 1 shows the components received according to the phase skips and table 2 shows the bits received according to the same phase skips.

TABLE 1

| COMPONENT | PHASE SKIP | | | |
|---|---|---|---|---|
| | 0 | $+\pi/2$ | $\pi$ | $-\pi/2$ |
| Pr | Pt | Qt | $\overline{Pt}$ | $\overline{Qt}$ |
| Qr | Qt | Pt | $\overline{Qt}$ | Pt |

TABLE 2

| BIT | PHASE SKIP | | | |
|---|---|---|---|---|
| | 0 | $+\pi/2$ | $\pi$ | $-\pi/2$ |
| $R_0$ | $C_0$ | $C_1$ | $\overline{C_0}$ | $\overline{C_1}$ |
| $R_1$ | $C_1$ | $C'_1$ | $\overline{C_1}$ | $\overline{C'_1}$ |
| $R'_0$ | $C'_0$ | $\overline{C_0}$ | $\overline{C'_0}$ | $C_0$ |
| $R'_1$ | $C'_1$ | $\overline{C_0}$ | $\overline{C'_1}$ | $C'_0$ |

For a phase skip of 0 or $\pi$ the received components Pr and Qr correspond either to the transmitted components or to their complement. In both cases Viterbi decoders ensure the correct decoding because they are transparent to a phase skip of $\pi$. Differential decoding resolves the ambiguity of $\pi$. On the other hand, for phase skips of $\pm\pi/2$ Viterbi decoders cannot find the transmitted components and the metrics diverge. As shown in table 2, the bit supplied to the inputs of the same Viterbi decoder are coded differently (171 or 133). For example, for a phase skip of $\pi/2$, the input $R_0$ of the decoder, which expects to receive a bit coded in accordance with code 171, receives the bits $C_1$ which was coded in accordance with code 133. It follows that Viterbi decoders cannot find the bits transmitted. In continuous transmission this leads to loss of synchronization. In TDMA transmission the entire received packet is lost. Note that this problem is a result of the fact that the 171 and 133 codes are transparent to phase skips of $\pi$ and not to phase skips of $\pm\pi/2$.

One object of the present invention is to overcome these problems.

To be more precise, one object of the invention is to provide a data coding/decoding system which is transparent not only to phase skips of $\pi$ but also to phase skips of $\pi/2$.

SUMMARY OF THE INVENTION

This object, and others that emerge below, are achieved by a system for coding/decoding digital data transmitted between a transmitter and a receiver, wherein said transmitter includes:

a demultiplexer receiving a digital bit stream to be transmitted and supplying two demultiplexed bit streams at the bit timing rate;

differential coding means receiving said demultiplexed bit streams and supplying two coded bit streams;

two convolutional coders each receiving one of said coded bit streams and each supplying a code word for each coded bit stream bit received;

two multiplexers for multiplexing said code words operating at said bit timing rate and each supplying one component of a symbol to be transmitted; and means for modulating and transmitting said symbol to be transmitted supplying a transmitted symbol, wherein said receiver includes:

means for receiving and demodulating said transmitted symbol supplying two components of the received symbol;

two demultiplexers each receiving one of said components of said received symbol and each supplying one received code word at said bit timing rate;

two Viterbi decoders each supplying a decoded word from said received code words;

differential decoding means receiving said decoded words and supplying two decoded bit streams; and a multiplexer for multiplexing said decoded bit streams supplying a received digital bit stream, and wherein each code word supplied by one of said convolutional coders is applied to a single multiplexer and each bit of a received code word is applied to a single Viterbi decoder. The digital data transmitted between the transmitter and the receiver has a frame structure including a frame alignment word also known as a unique word or recognition word and which enables the receiver to synchronize on the received signal to make $R_0$ correspond to $C_0$, $R_1$ to $C_1$, $R'_0$ to $C'_0$ and $R'_1$ to $C'_1$, respectively.

By eliminating interleaving of the processing channels at the transmitter and receiver the code words applied to the inputs of the Viterbi decoders correspond to the coded words and the decoders do not diverge. The convolutional coders can therefore supply code words which are not transparent to phase skips of $\pi/2$ and therefore have the generator polynomial G=(171, 133).

Other features and advantages of the invention will emerge from a reading of the following description of one preferred embodiment of the invention given by way of non-limiting illustrative example only with reference to the appended drawings.

BRIEF DESCRIPTION OF THE DRAWINGS

FIGS. 1A and 1B respectively show a digital data transmitter and digital data receiver conforming to the INTELSAT standard IESS-308.

FIGS. 3A and 3B respectively show a digital data transmitter and a digital data receiver of the invention.

DETAILED DESCRIPTION OF THE PREFERRED EMBODIMENT

Figure 2:
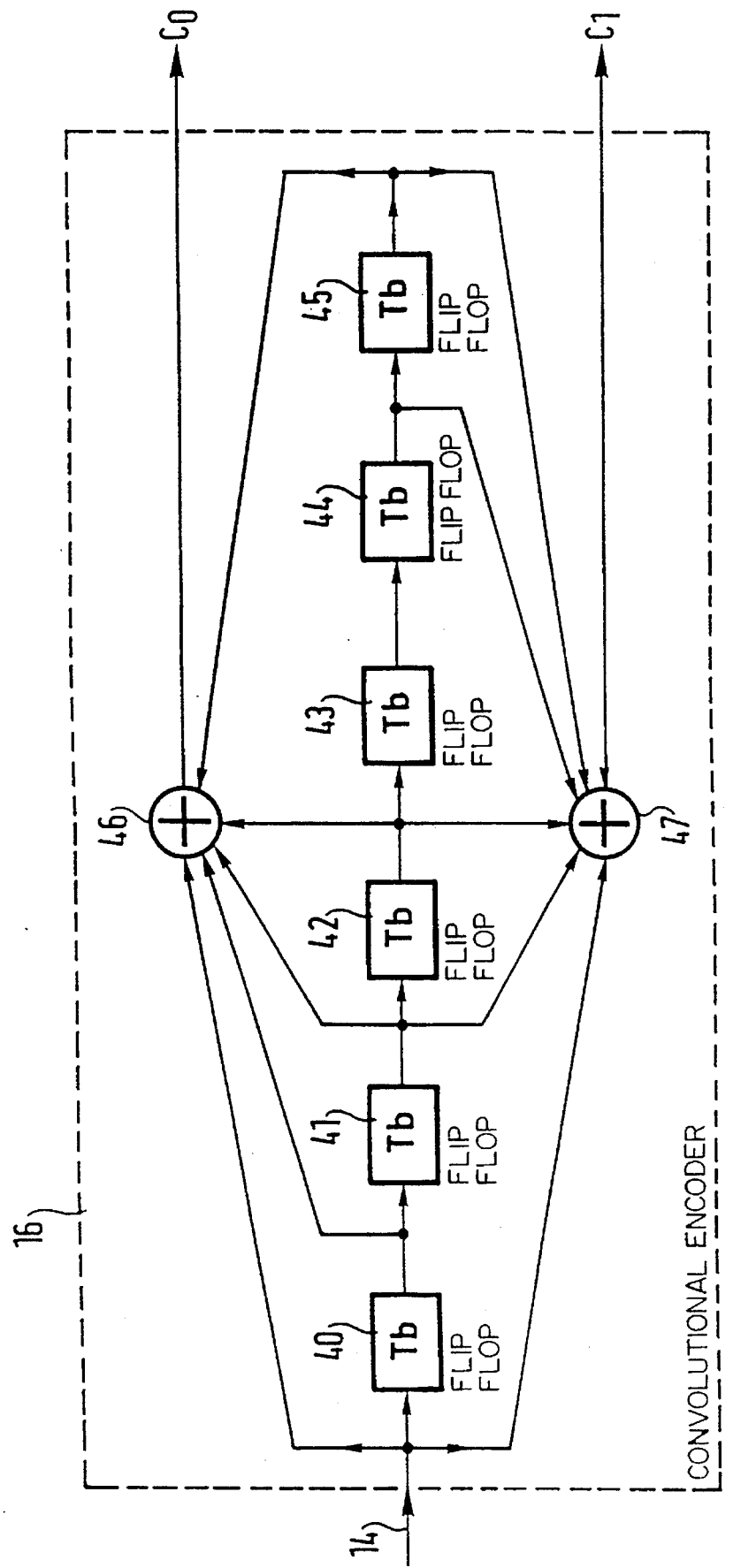
FIG. 2 shows a convolutional coder having the generator polynomial G=(171, 133).

FIGS. 1A, 1B and 2 have already been described in connection with the prior art.

FIGS. 3A and 3B respectively show a digital data transmitter and digital data receiver of the invention. Items identical to their counterparts in FIGS. 1A and 1B are identified by the same reference symbols.

The invention is distinguished from the prior art, among other things, by the fact that the processing channels are no longer interleaved. Thus, in the transmitter 3 in FIG. 3A, each code word ($C_0$, $C_1$) and ($C'_0$, $C'_1$) from one of the convolutional coders 16, 17 is applied to a single multiplexer 18, 19. Likewise, in the receiver 4 in FIG. 3B, each bit of a received code word ($R_0$, $R_1$) and ($R'_0$, $R'_1$) is applied to a single Viterbi decoder 24, 25.

What is more, the differential coders 13a and 13b in FIG. 1A are replaced by a single QPSK differential coder 13. Likewise, in the receiver, the differential decoders 28a and 28b are replaced by a single QPSK differential decoder 28.

The main object of the invention is to make the transmission system transparent to phase skips of $\pi$ and $\pi/2$. This object is achieved, as shown by table 3 below:

TABLE 3

| BIT | \multicolumn{4}{c}{PHASE SKIP} | | | |
|---|---|---|---|---|
| | 0 | $+\pi/2$ | $\pi$ | $-\pi/2$ |
| $R_0$ | $C_0$ | $C'_0$ | $\overline{C_0}$ | $\overline{C'_0}$ |
| $R_1$ | $C_1$ | $C'_1$ | $\overline{C_1}$ | $\overline{C'_1}$ |
| $R'_0$ | $C'_0$ | $\overline{C_0}$ | $\overline{C'_0}$ | $C_0$ |
| $R'_1$ | $C'_1$ | $\overline{C_1}$ | $\overline{C'_1}$ | $C_1$ |

The phase skips are as in table 1 above. To be more precise, for a phase skip of 0 or $\pi$ the received components Pr and Qr correspond either to the components transmitted or to their complements, as in the prior art. The phase ambiguity of $\pi$ is resolved by the QPSK differential decoding.

On the other hand, for phase skips of $\pm\pi/2$, the Viterbi decoders 24 and 25 receive code words that they recognize because they receive the code words ($C'_0$, $C'_1$) or ($\overline{C_0}$, $\overline{C_1}$) if a phase skip of $+\pi/2$ occurs and ($\overline{C'_0}$, $\overline{C'_1}$) or ($C_0$, $C_1$) if a phase skip of $-\pi/2$ occurs. Thus, regardless of the phase difference between the modulated signal and the local oscillator signal, decoding is correct and the Viterbi decoders do not diverge.

Note that the demultiplexers 22 and 23 can be those usually included in Viterbi decoders in which case the serial inputs of the decoders are used.

The invention can be applied to continuous transmission in which the signals transmitted have a frame structure including a frame alignment word (unique word or recognition word enabling synchronization) but finds a particularly beneficial application in TDMA transmission because a phase skip generates only a short error packet.

In TDMA transmission the unique word present in the preamble of each packet transmitted is used to synchronize the demultiplexers 22 and 23 (or the Viterbi decoders 24 and 25 when the serial inputs of these decoders are used) at the start of the wanted information, i.e. so that ($C_0$, $C_1$) and ($C'_0$, $C'_1$) respectively correspond to ($R_0$, $R_1$) and ($R'_0$, $R'_1$). This synchronization can be achieved by prior art means, for example a unique word detector as described in the aforementioned patent application.

Simulations have shown that in the absence of noise the number of errors in the event of a carrier cycle skip does not exceed 50 for a ¾ punctured code. To this end a puncture circuit is inserted between the differential coder 13 and the multiplexers 18 and 19 and a depuncture circuit is inserted between the demultiplexers 22 and 23 and the Viterbi decoders 24, 25. In the presence of noise (Eb/No=4 dB), the maximum number of errors per packet is close to 60, with an average of 25 errors per packet. For a non-punctured code of efficiency ½ and in the absence of any noise the number of errors per packet is less than 22 with an average of 7.5 errors per packet.

There is claimed:

1. System for coding/decoding digital data transmitted between a transmitter and a receiver, wherein said transmitter includes:

a demultiplexer receiving a digital bit stream to be transmitted and supplying two demultiplexed bit streams at a bit timing rate;

differential coding means receiving said demultiplexed bit streams and supplying two coded bit streams;

two convolutional coders each receiving one of said coded bit streams and each supplying a code word for each coded bit stream bit received;

two multiplexers for multiplexing said code words operating at said bit timing rate and each supplying one component of a symbol to be transmitted; and means for modulating and transmitting said symbol to be transmitted supplying a transmitted symbol, wherein said receiver includes:

means for receiving and demodulating said transmitted symbol supplying two components of the received symbol;

two demultiplexers each receiving one of said components of said received symbol and each supplying one received code word at said bit timing rate;

two Viterbi decoders each supplying a decoded word from said received code words;

differential decoding means receiving said decoded words and supplying two decoded bit streams; and a multiplexer for multiplexing said decoded bit streams supplying a received digital bit stream, and wherein said digital data has a frame structure including a frame alignment word, each code word supplied by one of said convolutional coders is applied to a single multiplexer and each bit of said received code word is applied to a single Viterbi decoder, and said differential coding means and said differential decoding means are of the QPSK type.

2. System according to claim 1 wherein said convolutional coders supply code words which are not transparent to phase skips of $\pi/2$.

3. System according to claim 1 wherein said convolutional coders use, as a generator polynomial, G=(171, 133).

4. System according to claim 1 wherein said digital data is transmitted in TDMA mode.

* * * * *